May 29, 1956 J. FALK 2,747,821
CLAMPING DEVICE FOR TUBING AND THE LIKE
Filed Nov. 7, 1951
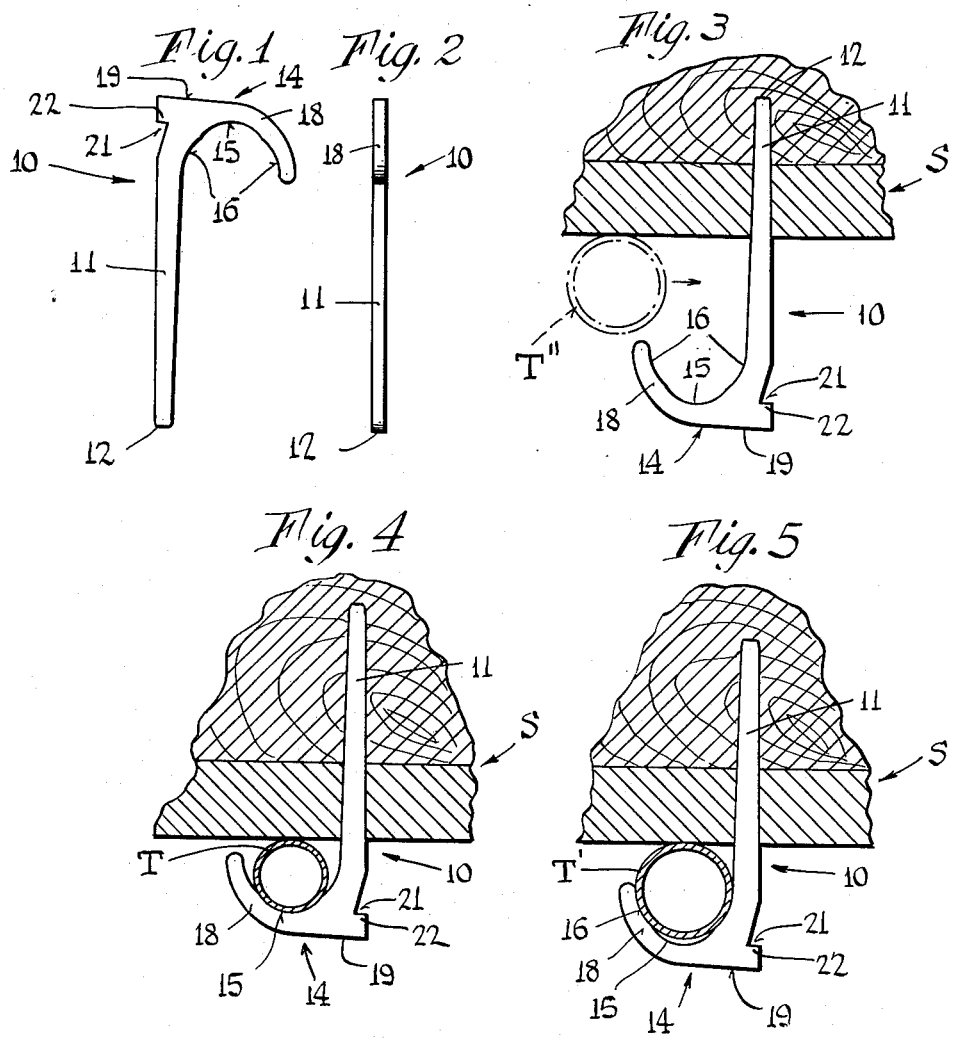
Inventor
Joseph Falk
By Johnson and Kline
Attorneys

United States Patent Office 2,747,821
Patented May 29, 1956

2,747,821

CLAMPING DEVICE FOR TUBING AND THE LIKE

Joseph Falk, Glastonbury, Conn.

Application November 7, 1951, Serial No. 255,302

2 Claims. (Cl. 248—71)

This invention relates to a fastening device and more particularly to a fastener for the clamping of pipe, tubing, conduit and other articles of similar contour to supporting structures.

Fastening devices of the type generally disclosed herein have been used to clamp various articles having a generally circular cross section to a supporting structure but it has always been a problem to provide a fastening device which is economical to manufacture and easy to install, and which stands up in use and may be readily moved, if desired.

One example of the fastening devices presently used in the industry comprises a J-shaped clip which is manufactured by first stamping out a blank having a shape resembling an attenuated tennis racket and then bending the wider portion thereof into a curved article-gripping portion with a part lanced out and extending upwardly as a continuation of the narrower part of the blank. Such a method of fabrication is naturally not the most economical due to the plurality and complexity of the manufacturing steps required and additionally has not resulted in a fastener capable of easy installation inasmuch as the lanced out part which is intended as a driving head does not extend upwardly sufficiently or definitely enough to be clear of the curved portion with the result that the curved portion has often been struck accidentally by a hammer during installation of the fastener and has crushed or otherwise damaged the article gripped thereby. Furthermore, the lanced-out part has created acute angles and narrow recesses in the fastener which prevent the deposition of an impermeable protective plating thereon whereby rusting of the fastener and galvanic action with a metallic article gripped thereby has resulted. The wider article-gripping portion has not been suitable for use on curved sections of tubing and thus the use of the fastener has had to be restricted to use only with straight sections. Furthermore, whenever it was desired to change the installation, the fastener could not be readily withdrawn due to the lack of any provision for removal and consequently the fastener could be removed only with difficulty and then with the possibility of crushing the article held thereby.

The present invention solves these problems by providing a fastener which may be easily and inexpensively manufactured by a single simple stamping operation on flat material such as a standard stock sheet or strip. The installation of the fastener is rapid and is made easy by the provision of a definite driving head portion to receive the hammer blow at the proper place to drive the shank portion of the fastener into the supporting structure with a lessened tendency to split or crack the same. The overall design of the fastener is such that there are no acute angles or narrow recesses which would prevent a satisfactory protective coating or plating of the fastener. An impermeable coating is therefore readily possible and may be applied to fasteners intended to be used in moist supporting structures to prevent rusting and bleeding of the rust stain into the plaster or like material around the fastener. Such a coating additionally prevents the development of any galvanic action between the exposed metal surfaces. Provision is also made adjacent the head portion to enable the fastener to be removed easily, as for example, by being engaged by a claw hammer or other tool to withdraw from the supporting structure without damage to the article supported thereon.

These features are obtained in the fastener of the present invention by a single stamping operation which also provides for applicability of the fastener to several sizes of tubing or conduit by a novel design of the gripping portion of the fastener whereby a plurality of arcuate surfaces of different curvature are formed which are capable of automatically engaging and receiving similarly curved surfaces without requiring any prior or subsequent adjustment, or involving any bending or distortion of the fastener or the article clamped thereby. Additionally, the width of the fastener, inasmuch as it is stamped from flat stock, is such that it will readily fit curved sections of tubing or pipe and may be so designed as to fit within the grooves in BX cable to prevent lengthwise creeping.

In the more specific aspects of the invention, the fastener comprises an L-shaped clamp or hook member wherein the longer arm of the L comprises a tapered shank having a pointed end for penetrating the supporting structure and wherein the shorter arm of the L extends laterally from the shank and forms the pipe-gripping portion. The concave inside part of the shorter arm is formed with a plurality of arcuate or curved surfaces having different curvatures to receive and engage the surfaces of pipe of different outside diameters. The formation of these arcuate surfaces is such that it leaves a slightly thinner portion at the center of the shorter arm whereby it is capable of yielding slightly to automatically adjust itself to variations in size between individual pipes.

The outside part of the shorter arm possesses a flattened area having a surface inclined upwardly toward the end of the shank portion to provide a forwardly located definite head portion for concentrating the force of the blow from a hammer or other tool during the driving of the fastener into the supporting structure without danger of striking the pipe-holding part.

In order that the fastener of the present invention may be readily removed from the supporting structure, a notch is formed in the shank portion near the head thereof and so positioned with respect to the arcuate pipe-gripping portion that it will be clear of the supporting structure when the fastener has been driven thereinto. Thus, the notch is always accessible to cooperate with and to afford gripping purchase to any tool such as claw hammer or the like to be used in withdrawing the fastener from the supporting structure.

Other features and advantages of the invention will be apparent from a consideration of the accompanying drawing and following specification wherein I have illustrated and described a preferred design of fastener embodying my invention but it is to be understood that my inventive concept is not to be considered as limited to the construction disclosed therein except as determined by the scope of the appended claims.

With reference to the accompanying drawing:

Figure 1 is a side elevation of the fastener.

Fig. 2 is an end elevation of the fastener.

Fig. 3 is a view in elevation showing the fastener partially embedded in a supporting structure and in position to receive tubing (shown in dot-dash outline).

Fig. 4 is a view in elevation showing a completed installation with the fastener clamping tubing to a supporting structure.

Fig. 5 is a view in elevation showing another completed installation with the fastener clamping tubing having a larger diameter.

The preferred embodiment of the fastening device of the present invention comprises an L-shaped hook member 10 which may be stamped from a flat metal sheet or strip in a single fabricating operation into its completed form ready for use, whereby such finishing operations as bending, forming, etc., are obviated. The straight longer arm 11 of the L comprises a flat tapered body or shank portion having an end 12 to provide for the penetration of and the positioning of the fastener in a supporting structure S, which may be a plaster or cement wall, or a wood molding or baseboard, or any similar structural material. The penetrating end 12 is preferably cut angularly to the axis of the shank, as shown in Fig. 1, inasmuch as such a conformation tends to prevent cracking or splitting of the structural material to a large degree. When so desired, the shank portion 11 may be long enough to pass through a wall surface of plaster, wall board, or the like, and enter a foundation member such as a stud, joist, or the like. When used, however, to hold tubing snug to baseboards, molding, beams, etc., wherein the shank enters the wood portion directly, a shorter shank may be employed.

In order to grip the article, a shorter arm 14 is formed and extends outwardly from the upper end of the shank portion 11 and forms the hook or gripping portion of the fastener. Due to the method of manufacture involving a single stamping operation, it will be apparent that the surfaces of the shank portion 11 and the shorter arm 14 will be co-planar. An arcuate surface 15 is formed at the deepest portion of the inner side of the arm 14 and possesses a radius of curvature to conform to and be capable of gripping and clamping pipe or tubing T of any predetermined standard size. For the purposes of illustration, the tubing T has been shown as a ⅜" O. D., such as set forth in Fig. 4. Additional arcuate surfaces 16, 16 may be formed adjacent surface 15 and have a radius of curvature to conform to and be gripping and clamping tubing T' of any standard size larger than tubing T. For the purposes of illustration only, such larger tubing has been shown as ½" O. D., as set forth in Fig. 5. These outside diameter sizes have been selected merely to exemplify the invention and other and additional sizes may be used, as desired.

The formation of these arcuate surface 15, 16 leaves a slightly thinner portion at the center of the arm 14 whereby sufficient resilience is created to permit a slight yielding of the arm 14 to insure a firm contact between the fastener and the tubing. The advantages of such a feature are apparent when it is realized that tubing, even of the same standard size, may vary one from another within certain prescribed tolerances but would still be capable of fitting the fastener.

The convex outside portion 18 of the arcuate arm 14 possesses a flattened surface 19 which is inclined upwardly at a slight angle to the axis of the shank. Such an incline is of great advantage when driving the fastener into the supporting structure inasmuch as it is much easier for the head of the hammer or other tool to strike the proper and more solid point of application above the shank and thus concentrate the driving force along the shank 11. This substantially lessens the possibility of striking the tip of the arcuate arm 14 whereby it could be bent and rendered useless for its intended purposes or could crush the tubing positioned therein. In the particular embodiment illustrated in the drawings, the surface 19 is inclined upwardly toward the axis of the shank 11 at approximately an angle of 4½° and merges into the head of the shank but such angle may be varied more or less within reasonable limits without departure from the concept involved.

A recess or notch 21 may be cut into the shank near its junction with the arcuate arm 14 and forms a projecting ledge 22 which thus is in a location which will always be clear of the supporting structure S when the fastener is driven to its clamping position. Consequently, whenever it is desired to withdraw the fastener 10 from the supporting structure to change the installation at any later time, the claw of a carpenter's hammer or any similar prying tool may be inserted in the recess under the ledge 22 and the fastener may be withdrawn easily without being bent and without crushing or otherwise damaging the tubing. The depth of the recess or notch 21 need merely be sufficient that the tip of the claw or other prying instrument be capable of sufficient gripping purchase on the ledge 22 to remove the fastener.

The relatively narrow width of the fastener lends itself to many advantageous features. When used in conjunction with pipe or tubing, it may be applied to a bend or curved section of such articles and will securely clamp the same in position, whereas a clip or fastener having a greater width would be incapable of conforming to the curvature of the bend in the pipe or tubing and a secure grip could not be obtained. Additionally, when being used with BX cable or other flexible armored equipment having a helical groove therein, the width of the fastener is such that it will fit within this groove to effectively prevent lengthwise slipping or creeping of the cable.

The installation of the fastener is shown in Figs. 3 through 5. The shank 11 may be rapidly driven into the supporting structure to a sufficient depth, such as half way, wherein it is held securely in proper position so as to leave an opening to receive the tubing T", shown in dot-dash outline. As many fasteners as required may be so positioned and thus a considerable portion of the work may be performed without actually placing the tubing in its ultimate location wherein it would be exposed to the danger of hammer blows which could bend or crush its walls. When all the fasteners are thus partially embedded in the supporting structure and in readiness to receive the tubing, it is then slipped into position and a few light hammer blows will suffice to complete the installation.

The overall design of the fastener is such that there are no acute angles or recesses which would complicate the manufacture thereof. Consequently, a single stamping operation is sufficient to form the fastener. Such a simple configuration also lends itself quite readily to coating or plating processes whereby an impermeable covering is formed on the fastener. Inasmuch as the majority of fasteners are made from steel or like metal and are normally plated with copper or like material, it is essential that the steel be completely protected from rusting, especially when used in a moist supporting structure such as plaster, or else rust will form and stain the surrounding area. Any breakdown in the protective coating would also create the possibility of galvanic action, such as between the steel of the fastener and the copper or other materials of the pipe tubing, which would be wholly undesirable.

The design of the fastener also lends itself to substantially any type of plating or coating, not only with metals but also with plastic materials, paints, etc., whereby a strongly adhering and impervious protective covering is obtained to increase the serviceable life of the fastener.

It is therefore seen that the problems of the prior art devices have been successfully solved by the fastener of the present invention and that such a fastener is capable of being manufactured by a single simple stamping operation on standard stock materials and labor are effected.

While I have shown and described what I believe to be a preferred embodiment of my invention in the matter of simplicity and durability of construction, ease of installation and use, etc., it will be obvious that the details of such construction may be more or less modified within the scope of the claims without departure from the principles of construction or material sacrifice of the advantages of the preferred design.

Variations and modifications may therefore be made within the scope of the invention and portions of the improvements may be used without others.

I claim:

1. A stamped flat sheet metal fastening device to clamp pipe, tubing and like articles to a supporting structure comprising a flat shank having an end portion to penetrate the supporting structure to which the articles are to be clamped and having a head portion at one end to facilitate the driving of the fastener into the supporting structure; an article-gripping portion coplanar with said shank and laterally projecting from one side thereof and having an inner curved surface facing the penetrating end portion to engage ad clamp tubular articles to the supporting structure; and a notch extending into and across said shank on the side opposite the article-gripping portion adjacent the head and adjacent to said inner surface so as to be clear of the supporting structure, when the fastener has been driven thereinto to clamp an article, said notch comprising a lower inclined wall extending inwardly and upwardly from the rear edge of the shank and intersecting a transverse wall located inwardly from the end of the shank and adapted to cooperate with removing means to apply a withdrawing force along a line within said shank to withdraw the fastener from the supporting structure.

2. A fastening device to clamp pipe, tubing and like articles to a supporting structure comprising a tapered shank portion to penetrate the supporting structure to which the articles are to be clamped and having a head portion at one end of the shank having a flat driving portion extending angularly upwardly to the axis of said shank to facilitate the driving of the fastener into the supporting structure; an article-gripping portion extending laterally of said shank and having an outer surface merging with said head portion and an inner part having a plurality of surfaces having different radii of curvatures to engage and clamp to the supporting structure articles having curved surfaces similar to either one of said radii of curvature on said article-gripping portion; and a notch on said flat shank extending into the side opposite the article-gripping portion adjacent the head and adjacent to said surfaces so as to be clear of the supporting structure, when the fastener has been driven thereinto to clamp an article, said notch extending across the back of the shank and comprising a lower inclined wall extending inwardly and upwardly from the rear edge of the shank and intersecting a transverse wall located inwardly from the end of the shank and cooperating with removing means to apply a withdrawing force along a line within said shank to withdraw the fastener from the supporting structure.

References Cited in the file of this patent

UNITED STATES PATENTS

| Number | Name | Date |
|---|---|---|
| 24,586 | Snyder | June 28, 1859 |
| 182,403 | Berger | Sept. 19, 1876 |
| 228,236 | Warren | June 1, 1880 |
| 268,613 | Brinkerhoff | Dec. 5, 1882 |
| 271,825 | Fiske | Feb. 6, 1883 |
| 279,228 | Dean | June 12, 1883 |
| 519,511 | Thompson | May 8, 1894 |
| 691,087 | Vaughan | Jan. 14, 1902 |
| 1,084,372 | Sommermeyer | Jan. 13, 1914 |
| 1,672,720 | Horsfall | June 5, 1928 |
| 1,794,817 | Zitko | Mar. 3, 1931 |
| 1,995,370 | Walters | Mar. 26, 1935 |